(No Model.) 2 Sheets—Sheet 2.

A. H. JOHNSON & T. H. PATENALL.
BLOCK SIGNAL APPARATUS.

No. 509,127. Patented Nov. 21, 1893.

Witnesses:—

Inventors:—
Arthur H. Johnson
Thomas H. Patenall
by attorneys

UNITED STATES PATENT OFFICE.

ARTHUR H. JOHNSON AND THOMAS H. PATENALL, OF RAHWAY, NEW JERSEY.

BLOCK-SIGNAL APPARATUS.

SPECIFICATION forming part of Letters Patent No. 509,127, dated November 21, 1893.

Application filed March 30, 1892. Serial No. 427,035. (No model.)

*To all whom it may concern:*

Be it known that we, ARTHUR H. JOHNSON and THOMAS H. PATENALL, both of Rahway, in the county of Union and State of New Jersey, have invented a new and useful Improvement in Electric Block-Signal Apparatus, of which the following is a specification.

Our invention relates to an improvement in electric block signal apparatus in which provision is made for permitting the signal and switch operating levers to be manipulated to throw the signal to "danger" or "safety" and open and close the switch at pleasure, after the operating lever has once been thrown to position of "line clear" and before the train on the block has passed station.

Our invention is more particularly directed toward improvements in connection with what is commonly known as the "Sykes system of block signaling apparatus" and it is to be understood that an instrument, such for example as that shown in Letters Patent No. 241,246, granted to W. R. Sykes May 10, 1881, is to be employed in connection with the lever locking and releasing mechanism herein shown and described.

Figure 1:
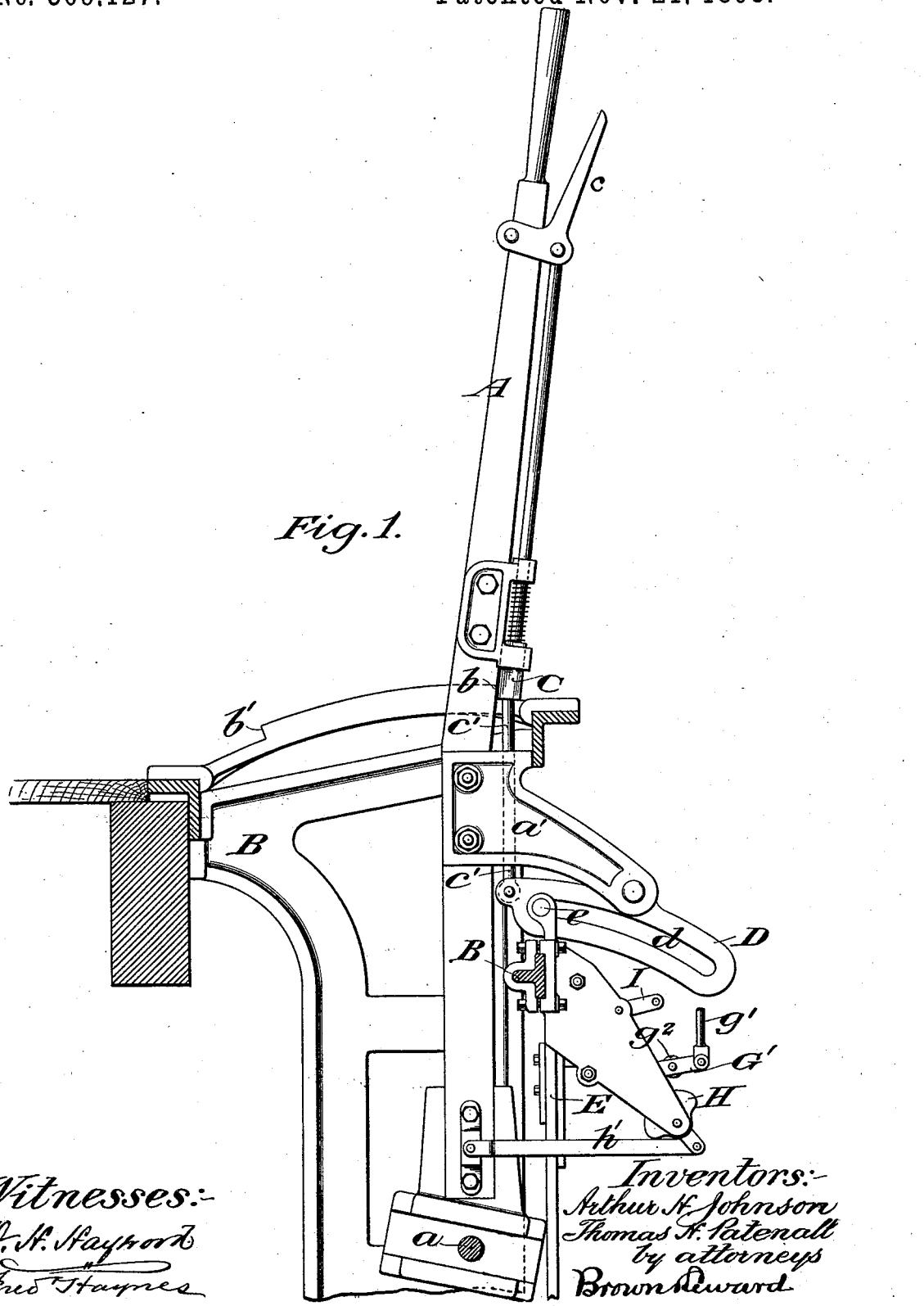
Figure 2:
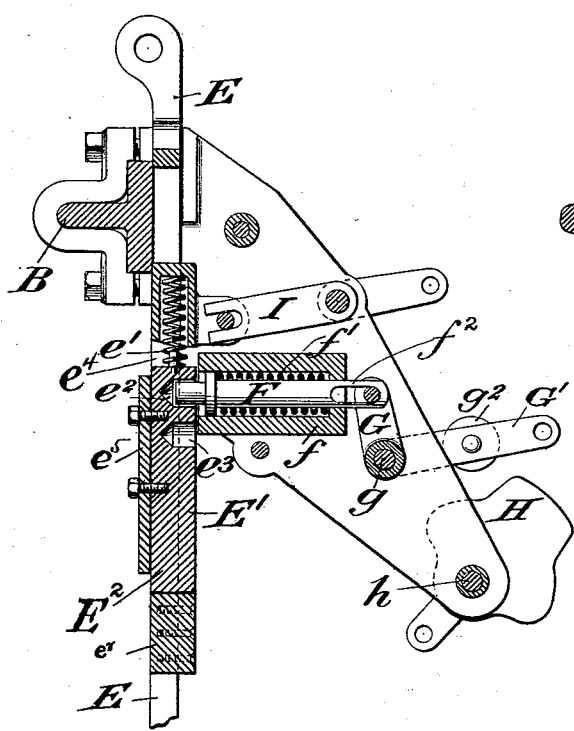
Figure 3:
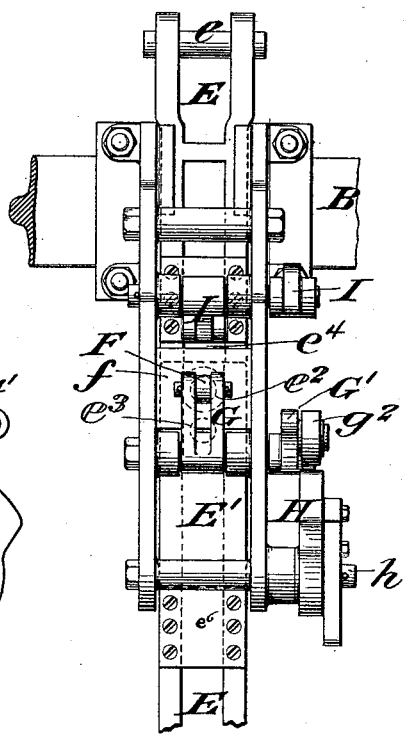

In the accompanying drawings, Figure 1 is a view of the signal operating lever and parts adjacent thereto, in side elevation. Fig. 2 is an enlarged view in detail, partly in section, of the tappet and its locking and releasing mechanism, and Fig. 3 is a view of the same in front elevation.

A represents the signal operating lever pivoted at $a$ to the frame B and provided with a spring actuated locking dog C operated by a handle $c$ in position to be grasped simultaneously with the grasping of the lever A, as is usual. The frame B is provided with abutments $b$ and $b'$ with which the dog C engages to hold the lever in position to indicate "danger" or "line blocked" and in position to indicate "safety" or "line clear."

The lever A has an arm or plate $a'$ fixed thereto, to the free end of which a slotted sector D is pivoted at a point intermediate of the opposite ends of the curved slot $d$. One end of the sector D is connected with the dog C by a rod or link $c'$ so that the movement of the dog will rock the sector.

A tappet E for locking and releasing the switch levers has a reciprocating movement in suitable bearings in the frame B and is connected at its upper end with the sector D by means of a stud $e$ which extends within the slot $d$. The stud $e$ is adapted to travel along the slot $d$ as the sector is swung with the lever. When the parts are in the position shown in Fig. 1, the lifting of the dog C will rock the sector D and lift the tappet E one half of its upward stroke, and when the lever is pulled over to the opposite abutment $b'$, the dropping of the dog C will lift the tappet E the remainder of its upward stroke, since the stud $e$ will then be upon the opposite side of the pivotal connection of the sector with the arm $a'$. The tappet E carries a reciprocating section E', so mounted as to have a limited sliding movement lengthwise of the tappet and independent thereof. In the present instance we have shown the section E' as provided with a tongue portion $E^2$ adapted to extend between the walls of an elongated slot $e^4$ in the tappet and held in position by a cap plate $e^5$ fastened to the tongue $E^2$ and overlapping the side walls of the slot $e^4$ at the back of the tappet, the sides of the plate E' itself being constructed to overlap the side walls of the slot $e^4$ at the front of the tappet. The downwardly sliding movement of the section $E^2$ is limited by a cross plate $e^6$, provided with a tongue portion $e^7$ projecting within the slot $e^4$ between the sides of the tappet. A spring $e'$ tends to hold the sliding section E' normally at the lowermost limit of its movement relatively to the tappet E. The section E' is provided with sockets $e^2$ and $e^3$, spaced a short distance apart and adapted to receive the end of a locking bolt or stop F. The bolt F is mounted within a suitable housing $f$ and a spring $f'$ tends to hold the bolt normally thrown into one of the sockets $e^2$ or $e^3$. A bolt operating lever is pivoted to the frame at $g$, one of its arms G being connected with the bolt F by a slot and pin connection $f^2$ so as to permit the lever to swing in one direction without operating the bolt, and the other arm G' of the lever being connected by a rod $g'$ with an electric block instrument, such for example as the Sykes instrument before referred to and not shown herein. The rod $g'$ in this application corresponds to the rod H', Fig. 4, of the Sykes patent, referred to. The arm G' of the lever also carries an anti-friction roller $g^2$ with which a cam H, pivotally secured to the frame at $h$, engages. The cam H is connected by a link $h'$ with the lever A and as the lever rocks back and forth to throw the signal to "safety" or "danger," the cam H will be rocked into engagement with the roller $g^2$ and the bolt operating lever will be thereby rocked to lift the arm G'.

A lever I has a loose connection with the tappet E and is adapted, through a suitable connection with the instrument, such a connection, for example, as that represented by $L^2$, Fig. 4, of the said Sykes patent, to prevent the plunger from operating or leave it free to be operated in the instrument.

In operation, supposing the signal operating lever and the parts connected therewith to be in the position shown in Fig. 1 with the signal at "danger," "line blocked" and the tappet down in position to lock the switch levers; if now it be desired to throw the parts into position to indicate "safety," "line clear" and unlock the switch levers, the instrument—not shown herein—is operated by an electric current under the control of a plunging mechanism at a succeeding instrument, as particularly set forth in the Sykes patent, referred to, to depress the rod $g'$ and thereby rock the lever G, G' and withdraw the bolt F from the socket $e^2$ in the sliding section E'. The dog C may then be lifted so as to pass over the abutment $b$ and the lever A may be swung over into position to bring the signal to "safety" by the dropping of the dog C into engagement with the abutment $b'$ to hold it. The raising of the dog C will have lifted the tappet E so as to bring the end of the bolt F opposite the space between the two sockets $e^2$ and $e^3$ and the lowering of said dog into engagement with the abutment $b'$ will have completed the elevation of the tappet E so as to bring the bolt F opposite the socket $e^3$. Furthermore, the swinging movement of the lever A will have rocked the cam H into engagement with the roller on the arm G' of the bolt operating lever and will thereby have lifted the arm G' of said lever and so rocked the lever as to permit the bolt F to enter the socket $e^3$ in the section E'. If it be desired for any purpose to raise the dog C to swing the signal lever back to "danger," it may be done since the sector D will be permitted to rock and depress the tappet E against the pressure of the spring $e'$ until it is interrupted by its engagement with the upper end of the section E', held in position by the locking bolt F. Such depression of the tappet E amounts to only about one half of its downward stroke and hence the dog C will not be permitted to drop into engagement with the abutment $b$ when the lever is thrown back into "danger" position until the bolt operating lever shall have been again operated by the instrument to withdraw the bolt from the socket $e^3$. The movement of the lever I by the part downward stroke of the tappet is not sufficient to set the instrument (not shown) so as to admit of plunging to receive another train on the block and hence it follows that the lever A may be, after it is once unlocked, moved back and forth to "danger" or "safety" as may be desired until the passing of the train shall have withdrawn the locking bolt F and thereby permitted the tappet E to fall its entire stroke to set the dog C against the abutment $b$ and again lock the parts in position of "danger" and leave the instrument free to receive another train.

What we claim is—

1. The combination with the vibrating operating lever and the locking device to hold it in its rocked adjustments, of a stop for controlling the movements of the lever locking device and a movable connection between the stop and the lever locking device to permit a predetermined movement of the lever locking device when the stop is in locking position, said stop being adapted to be operated by an electric instrument, substantially as set forth.

2. In combination, a vibrating lever, a locking device for holding the lever in position, a tappet under the control of the said locking device, a stop for locking the tappet and a movable connection between the stop and the tappet whereby the tappet is allowed a predetermined movement independent of the stop, substantially as set forth.

3. In combination, a vibrating operating lever, a locking device for holding it in position, a tappet, a swinging sector forming a connection between the locking device and tappet, a stop for locking the tappet and a movable connection between the stop and the tappet, substantially as set forth.

4. In combination, a vibrating operating lever, a locking device for holding it in position, a stop for controlling the lever locking device, a movable connection between the stop and lever locking device, a cam for operating the stop and a connection between the cam and the operating lever, substantially as set forth.

5. In combination, the operating lever with its locking dog, the tappet connected with the locking dog, the reciprocating bolt or stop, the sliding section connected with the tappet and provided with seats at intervals to receive the bolt or stop and means for operating the bolt or stop, substantially as set forth.

6. In combination, the tappet and means for operating it, the reciprocating bolt or stop and the lever for operating it, the lever having a loose connection with the bolt or stop by which the lever is allowed to swing a predetermined distance independently of the bolt or stop, substantially as set forth.

ARTHUR H. JOHNSON.
THOMAS H. PATENALL.

Witnesses:
FREDK. HAYNES,
I. B. DECKER.